United States Patent
Ryan et al.

(10) Patent No.: US 8,359,375 B2
(45) Date of Patent: Jan. 22, 2013

(54) MIGRATION OF DATA BETWEEN COMPUTERS

(75) Inventors: Christopher Ryan, Mountain View, CA (US); John A. Vink, San Jose, CA (US); Jean-Pierre Ciudad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/157,218

(22) Filed: Jun. 9, 2011

(65) Prior Publication Data
US 2011/0238799 A1    Sep. 29, 2011

Related U.S. Application Data

(63) Continuation of application No. 10/863,124, filed on Jun. 7, 2004, now Pat. No. 7,975,028.

(51) Int. Cl.
*G06F 15/177* (2006.01)
(52) U.S. Cl. ......... 709/220; 709/221; 709/222; 709/248
(58) Field of Classification Search .......... 709/220, 709/221, 222, 248
See application file for complete search history.

(56) References Cited

U.S. PATENT DOCUMENTS

| | | | |
|---|---|---|---|
| 5,732,216 A * | 3/1998 | Logan et al. ............... | 709/203 |
| 5,832,274 A | 11/1998 | Cutler et al. | |
| 5,974,547 A * | 10/1999 | Klimenko ..................... | 713/2 |
| 6,889,376 B1 * | 5/2005 | Barritz et al. ................ | 717/175 |
| 7,093,002 B2 * | 8/2006 | Wolff et al. .................. | 709/219 |
| 7,093,003 B2 | 8/2006 | Yuh et al. | |
| 7,269,721 B2 * | 9/2007 | McCardle ..................... | 713/1 |
| 7,284,015 B2 | 10/2007 | Pudipeddi et al. | |
| 7,356,816 B2 | 4/2008 | Goodman et al. | |
| 2002/0091805 A1 * | 7/2002 | Phillips et al. .............. | 709/220 |
| 2002/0188357 A1 * | 12/2002 | Boelkens et al. ............ | 700/86 |
| 2004/0030651 A1 * | 2/2004 | Kim et al. .................... | 705/51 |
| 2004/0128203 A1 * | 7/2004 | Pierre et al. ................. | 705/26 |
| 2004/0153473 A1 * | 8/2004 | Hutchinson et al. ........ | 707/104.1 |
| 2004/0153718 A1 * | 8/2004 | Shen et al. ................... | 714/5 |
| 2005/0198215 A1 * | 9/2005 | Helmerich ................... | 709/220 |
| 2006/0270418 A1 * | 11/2006 | Hannu et al. ................ | 455/455 |

* cited by examiner

*Primary Examiner* — Liangche A Wang
(74) *Attorney, Agent, or Firm* — Womble Carlyle Sandridge & Rice LLP (57) ABSTRACT

Techniques and mechanisms that allow configuration information, applications and/or data to be transferred between computer systems in an automated, or partially automated, manner, which may allow for more efficient transfer as compared to manual transfer. A source computer system may be coupled with a destination computer system directly via a wired or wireless communications channel. Data including, for example, user identification information, network settings, system settings, permissions and/or other data may be transferred from the source computer system to the destination computer system.

22 Claims, 5 Drawing Sheets

MIGRATION OF DATA BETWEEN COMPUTERS

This application is a continuation of U.S. application Ser. No. 10/863,124 filed on Jun. 7, 2004 now U.S. Pat. No. 7,975,028.

TECHNICAL FIELD

Embodiments of the invention relate to electronic systems such as computer systems. More particularly, embodiments of the invention relate to techniques for automatic migration of data between electronic systems, for example, migration of data from an older computer system to a newer computer system.

BACKGROUND

Currently, when a customer purchases a new electronic device such as a computer to replace an older electronic device, configuration data that has been stored in the older device must be reproduced if the customer would like the configuration data on the newer device. Configuration data may include, for example, network settings, user names and passwords, application preferences, etc. Migration of data between electronic devices may be desirable in other situations including, for example, configuration of multiple computer systems to have the same or substantially the same configuration. Manual reproduction of configuration data may be time consuming, frustrating and error prone, which may result in the inefficient use of resources.

SUMMARY

Methods and apparatuses for automatically transferring data between two electronic devices are disclosed. A boot operation of a source electronic device coupled with a destination electronic device is detected. Configuration and/or other data are automatically transferred the source electronic device to the host electronic device. In one embodiment, the source electronic device is booted in a on-standard boot mode.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described in greater detail below are techniques and mechanisms that allow configuration information, applications and/or data to be transferred between electronic devices such as, for example, computer systems in an automated, or partially automated, manner, which may allow for more efficient transfer as compared to manual transfer. In one embodiment, a source computer system (or other electronic device) may be coupled with a destination computer system (or other electronic device) via a wired or wireless communications channel. Data including, for example, user identification information, network settings, system settings, permissions and/or other data may be transferred from the source computer system to the destination computer system.

Figure 1:
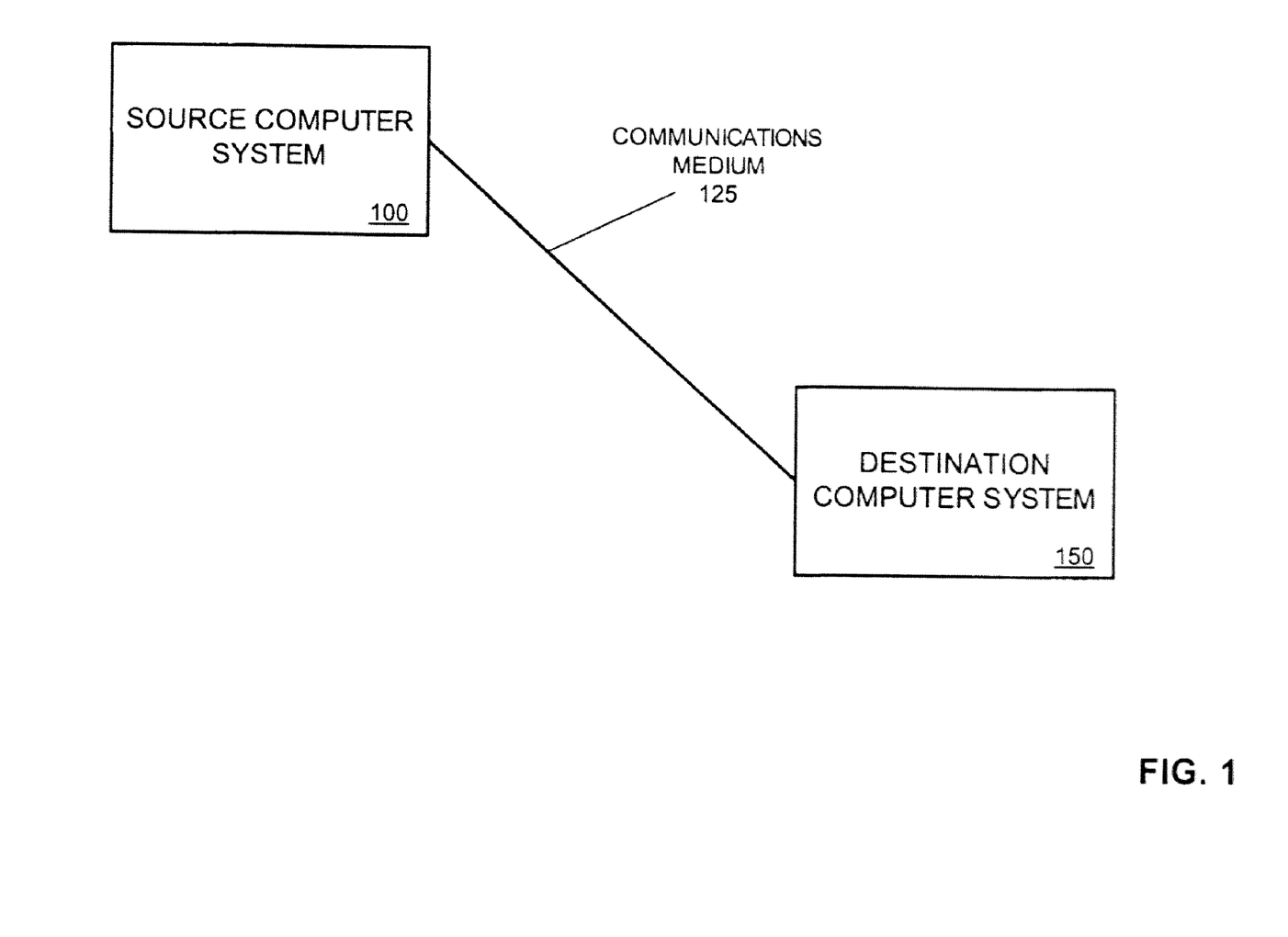
FIG. 1 is a block diagram of an interconnected source computer system and destination computer system.

FIG. 1 is a block diagram of an interconnected source computer system and destination computer system. The examples that follow are described in terms of transferring data between computer systems; however, the techniques described may be used to transfer data between other types of electronic systems.

Source computer system 100 stores data to be transferred to destination computer system 150 over communications medium 125. Source computer system 100 may be, for example, a computer system that has been used and customized by a user. Customization of source computer system 100 may include, for example, installation of software, system configuration (e.g., time, date and location settings, keyboard settings, mouse/trackpad settings), user data (e.g., user identifiers, passwords, account numbers), network settings (e.g., IP address, wireless communications settings, network passwords, cryptographic keys), as well as other and/or different data.

Destination computer system 150 may be, for example, a new computer system that with which the user may replace source computer system 100. In order to begin using destination computer system 150, the user may be required to, or may wish to, replicate data and/or settings of source computer system 100 on destination computer system 150. In one embodiment, data may be transferred between source computer system 100 and destination computer system 150 over communications medium 125. As described in greater detail below, transfer of data from source computer system 100 to destination computer system 150 can be completely or partially automated, which may reduce the possibility for errors and/or reduce the time required to configure destination computer system 150 as desired.

Figure 2:
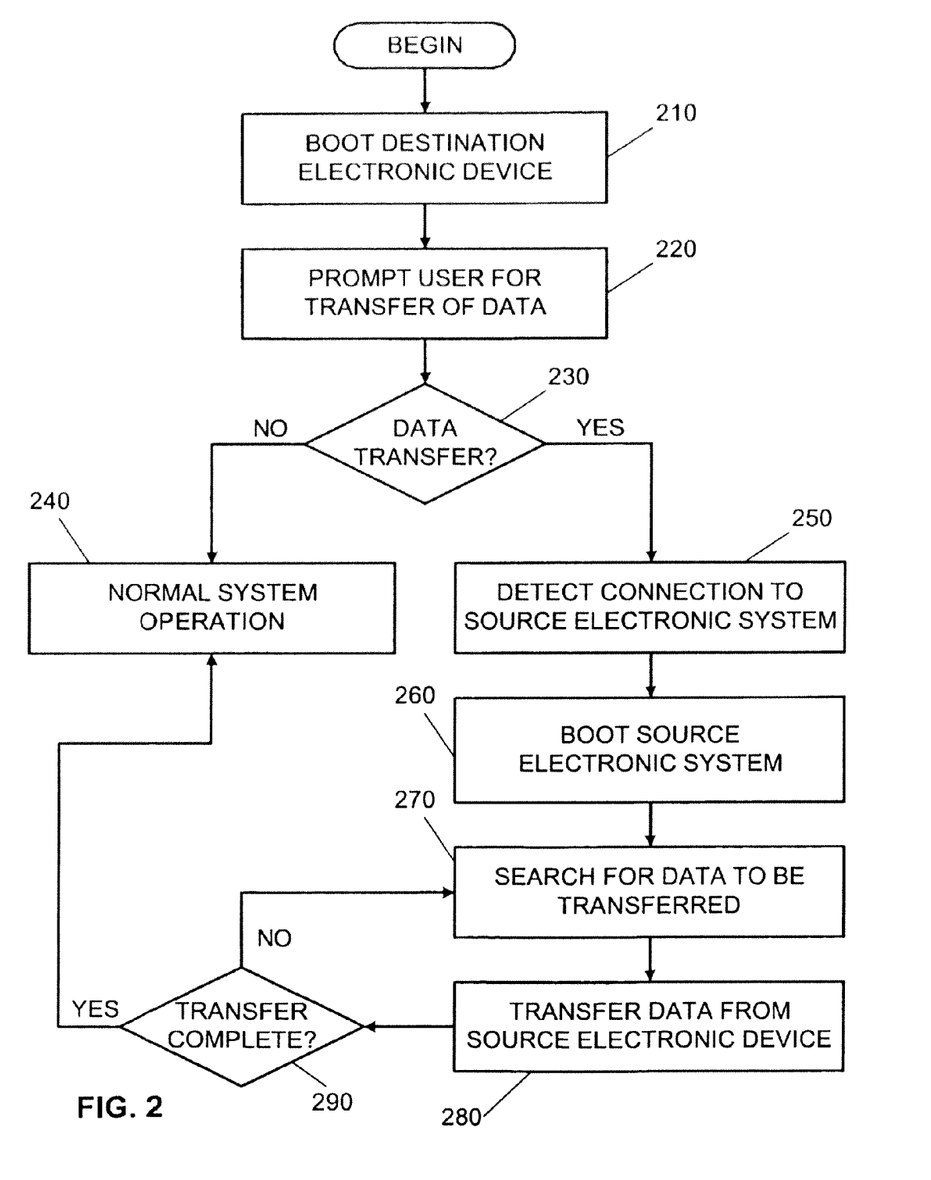
FIG. 2 is a flow diagram of one embodiment of a process for transferring data from a source electronic system to a destination electronic system.

FIG. 2 is a flow diagram of one embodiment of a process for transferring data from a source electronic system to a destination electronic system. The process of FIG. 2 may be used, for example, when a new computer system is acquired to replace a previously used computer system, or to configure multiple computer systems in the same manner.

A user may boot a destination electronic device, 210. The destination electronic device may be, for example, computer system or other electronic device to be configured. The user is prompted for transfer of data, 220. The user may be prompted, for example, in response to a first boot up of a device or when certain pre-selected information (e.g., user name(s), password(s), device settings) is absent in the destination electronic device. The destination electronic device may also include a "setup assistant" or a "setup wizard" that the user may invoke to transfer data from another device.

If the user elects not to transfer data, 230, the destination electronic device enters normal system operation, 240. If the user elects to transfer data, 230, the destination electronic system detects a connection to a source electronic system, 250. In one embodiment, when the user elects to transfer data, the setup assistant/wizard may instruct to user to connect the source device to the destination device using a particular port (e.g., an IEEE 1394 port), or the user may be allowed to select a port to be used for transfer of data (e.g., USB, serial, parallel, IEEE 1394). IEEE 1394 interfaces and communication are described in an IEEE document entitled, "1394: Open Host Controller Interface Specification" Release 1.1, Jan. 6, 2000 as well as related and subsequent documents (e.g., IEEE 1394b).

In one embodiment, the user is presented with choices regarding what data can be transferred from the source electronic system to the destination electronic system. The data to be transferred may include configuration data, application files, data files and/or other types of data. The configuration data may include, for example, one or more user names, one or more passwords associated with the user names or other types of passwords, network settings (e.g., security settings, network keys, IP addresses) and local system settings (e.g., local time and/or date, time zone, keyboard type, regional settings, power usage parameters). Other data that may be transferred may include files stored in a home or root directory, disk partitions, selected applications with associated support and/or data files, etc.

In one embodiment, the source electronic system may be booted up, 260. In one embodiment, the source electronic system is booted in a non-standard boot mode, which may be, for example, a target disk mode in which the source electronic system operates as a storage device for the destination electronic system. Thus, the destination electronic system may control access to data stored on the source electronic system without accessing the data through a normal operating mode. Other non-standard boot modes as well as standard boot modes can also be used. In one embodiment, the destination electronic system may detect that the source electronic system has been booted; however, transfer of data may occur without this detection.

The destination electronic system and/or the source electronic system may search for the data to be transferred, 270. Various techniques for searching and accessing data to be transferred are described in greater detail below. In general, in order to accurately transfer configuration data from the source electronic system to the destination electronic system, one or more consistency checks may be performed.

In one embodiment, when user data is transferred from the source electronic device to the destination electronic device, if the destination electronic device has no user data or no conflicting user data, the user data is copied from the source electronic device to the destination electronic device. If a conflict exists between the user data on the source electronic device and the destination electronic device, for example, a user identifier used on the source electronic device is not available on the destination electronic device, the conflicting data may be automatically modified, or the user may be prompted to modify the conflicting data. For example, if the source electronic device has a user identifier of 501 and data for user 501 is to be transferred to the destination electronic device where another user identified as 501 exists, the user identifier may be modified (e.g., incremented to 502, if no conflicts exist with 502) or the use may be prompted to provide a different user identifier.

When a user identifier is modified, ownership indicators may also be modified to be consistent with the new user identifiers. For example, if a user identifier is changed from 501 to 502, files that are transferred may have ownership information corresponding to user 501, which may be a different user on the destination electronic device. In one embodiment, ownership information corresponding to data transferred from the source electronic device from which user data has been transferred and changed may also be changed to be consisted with the new user identifier(s). In one embodiment, if an application and/or data is transferred and the corresponding user data is not transferred, all users on the destination electronic system may be granted ownership of the application and/or data so that the transfer does not result in inaccessible data on the destination electronic system.

The data is transferred from the source electronic device to the destination electronic device, 280. If the data transfer is complete, 290, the destination electronic device may transition to normal system operation, 240. If the data transfer is not complete, 290, the destination electronic system and/or the source electronic system may search for additional data to be transferred, 270.

Figure 3:
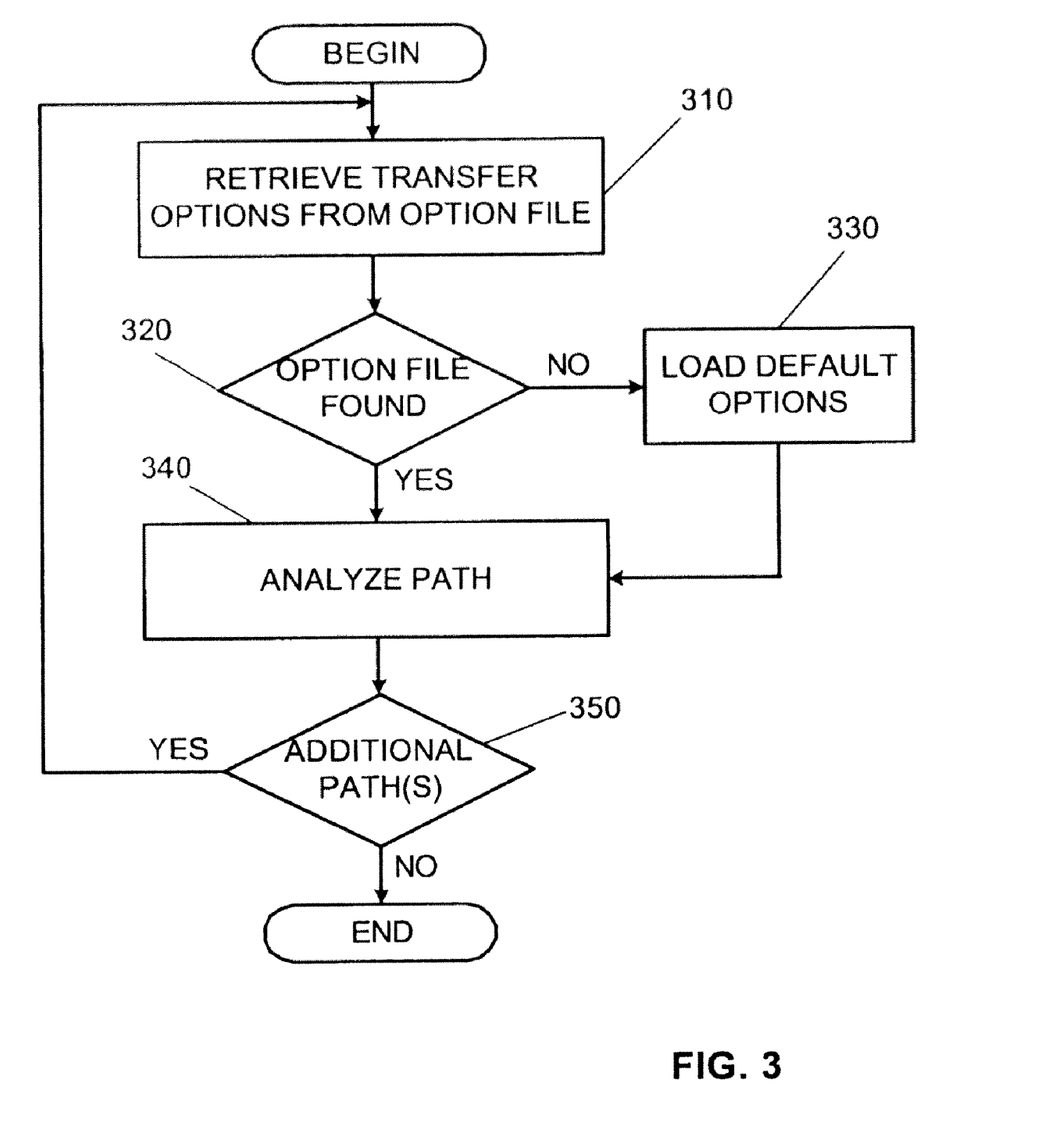
FIG. 3 is a flow diagram of one embodiment of a technique for searching the source electronic system for data to transfer to the destination electronic system.

FIG. 3 is a flow diagram of one embodiment of a technique for searching the source electronic system for data to transfer to the destination electronic system. In one embodiment data stored on the source electronic system may be searched by paths. In alternate embodiments, other organizational components of data may be searched. In one embodiment, the technique described with respect to FIG. 3 is performed for each path to be processed in the search for data to be transferred from the source electronic device to the destination electronic device.

In one embodiment, a user or other entity may provide options regarding the paths to be searched and/or the types of data to be searched, 310. The search options can be provided in any manner known in the art. For example, path analysis options may be provided as a file (e.g., a XML file) so that the analysis algorithm may be modified without changing the code used to perform the search. The option file may include information regarding, for example, search techniques to use for specific applications or special case searches for predefined conditions.

If the option file does not exist, 320, default search options are loaded, 330. The various paths of the source electronic system are analyzed, 340, using either the default search options or the otherwise provided search options. If additional paths are to be analyzed, 350, the process is repeated for each path. Once each designated path is analyzed, 350, the path processing procedure is complete. One embodiment for path analysis is described in greater detail with respect to FIG. 4.

Figure 4:
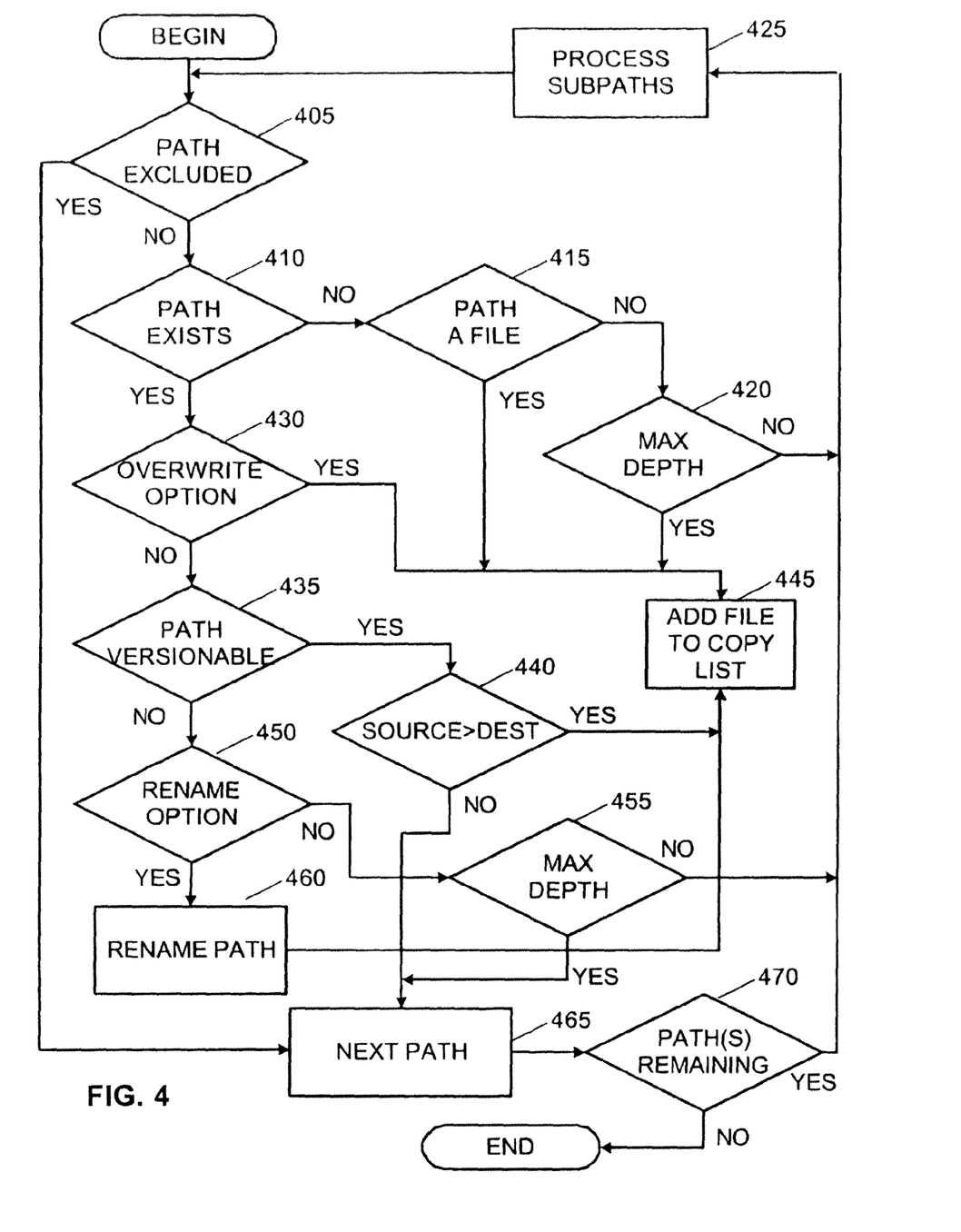
FIG. 4 is a flow diagram of one embodiment of a path analysis procedure.

FIG. 4 is a flow diagram of one embodiment of a path analysis procedure. In one embodiment, path analysis begins with a root or home path (indicated by depth=0), 400. Alternatively, path analysis can begin with other locations, for example, an applications folder, or a specific file hierarchy. In one embodiment, the process of FIG. 4 is performed for each path on the source electronic system.

If the path being analyzed is excluded, 405, the next path is analyzed, 465. A path may be excluded by a listing in the option file or by being excluded by the default options. For example, security applications may be excluded and any path that corresponds to a security application may be excluded. The paths to be excluded may be identified by name (e.g., by application or file name) or by condition (e.g., paths or files over a certain size).

If the path being analyzed is not excluded, 405, the agent performing the analysis determines whether the path exists, 410. In one embodiment, a path does not exist if the pointer for the path does not include sub-paths. For example, if the path that does not exist, 410, is identified as a file, 415, the file is added to the copy list, 445. If the path does not represent a file, 415, the agent determines whether the maximum path depth has been reached, 420. The maximum path depth may be unlimited or may be a finite number beyond which files are not added to the copy list, 445. If the maximum path depth has not been reached, 420, any sub-paths identified are analyzed, 425.

If the path being analyzed exists, 410, and the overwrite option in the option file (or defaults) is set to yes, 430, the path or file is added to the copy list, 445. In one embodiment, if the overwrite option is set to yes, a file on the source electronic device having the same name as a file on the destination electronic device overwrites the file on the destination electronic device.

If the overwrite option is set to no, 430, the agent determines whether the path is versionable, 435. In one embodiment, a versionable path is a path in which the version of one or more files within the path may be determined. For example, a metadata file associated with a path, file or application may have a version for the associated path, file or application. As another example, the version may be determined from the path name or a label. If the path is versionable, 435, and the source version is newer than the destination version, 440, the file is added to the copy list, 445. If the path is versionable, 435 and the source version is not newer than the destination version, 440, the next path is analyzed, 465.

If the path is not versionable, 435, the agent determines whether the rename option is set. The rename option allows the name of the copied files to be changed when the copied files are stored on the destination electronic device. For example, if an un-versionable file is copied the name may have an appended string (e.g., "... from old computer") that indicates the source or ownership of the copied file. Renaming may also serve other purposes. If the rename option is set, 450, the path is renamed, 460, and added to the copy list, 445. If the rename option is not set, 450, and the maximum depth is not reached, 455, sub-paths are processed, 425. If the rename option is not set, 450, and the maximum depth is reached, 455, the next path is analyzed, 465.

Figure 5:
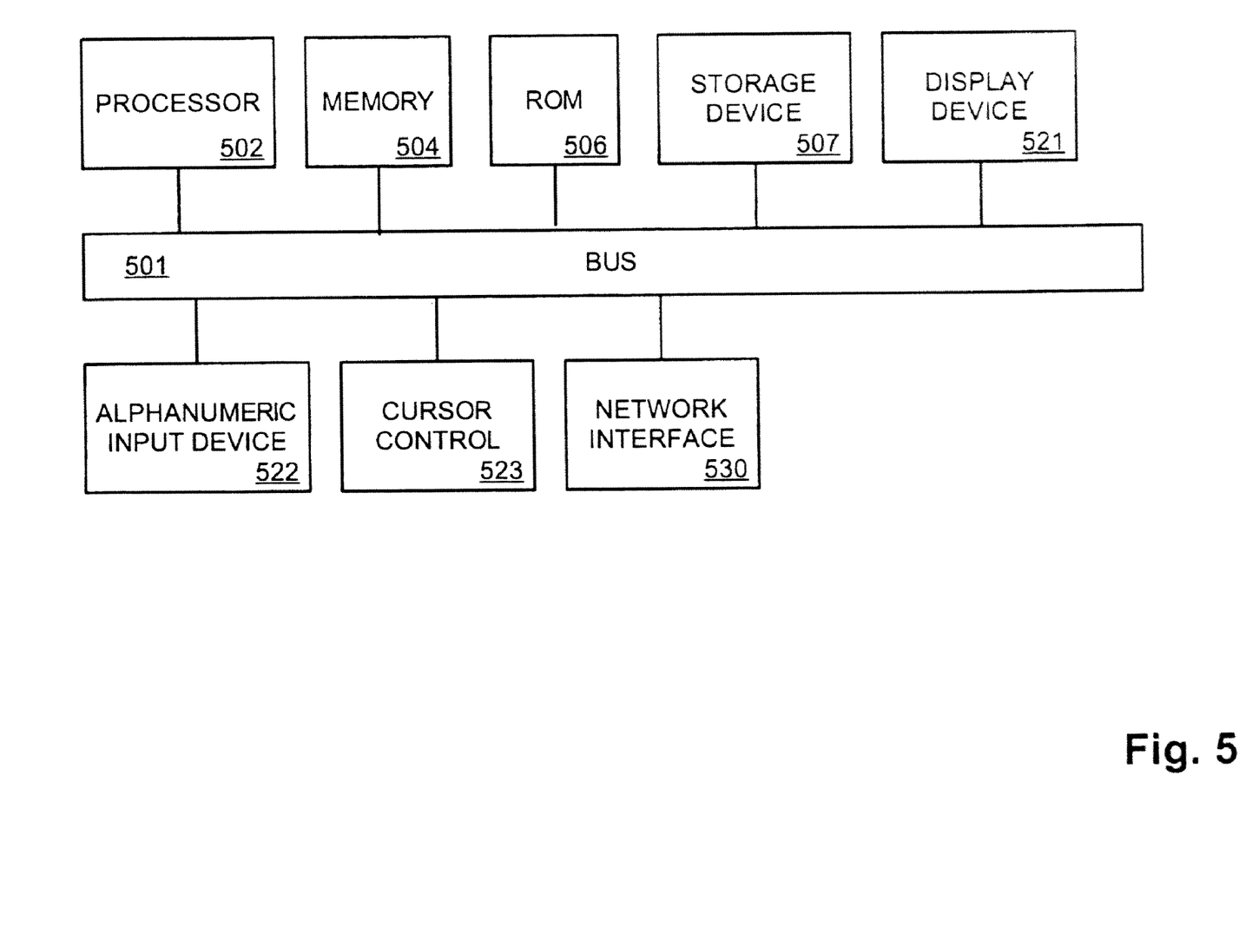
FIG. 5 is a block diagram of one embodiment of an electronic system.

In one embodiment, the techniques described herein can be implemented as sequences of instructions executed by one or more electronic systems. The sequences of instructions can be stored by the electronic device(s) or the instructions can be received by the electronic device(s), for example, via a network connection. FIG. 5 is a block diagram of one embodiment of an electronic system. The electronic system illustrated in FIG. 5 is intended to represent a range of electronic systems, for example, computer systems, network access devices, personal digital assistants, etc. Alternative systems, whether electronic or non-electronic, can include more, fewer and/or different components. In the transfer of data described above, the source electronic device may be any type of electronic device. Similarly, the destination electronic device may be any type of electronic device. In one embodiment, both the source electronic device and the destination electronic device are computer systems.

Electronic system 500 includes bus 501 or other communication device to communicate information, and processor 502 coupled to bus 501 to process information. While electronic system 500 is illustrated with a single processor, electronic system 500 can include multiple processors and/or co-processors. Electronic system 500 further includes random access memory (RAM) or other dynamic storage device 504 (referred to as memory), coupled to bus 501 to store information and instructions to be executed by processor 502. Memory 504 also can be used to store temporary variables or other intermediate information during execution of instructions by processor 502.

Electronic system 500 also includes read only memory (ROM) and/or other static storage device 506 coupled to bus 501 to store static information and instructions for processor 502. Data storage device 507 is coupled to bus 501 to store information and instructions. Data storage device 507 such as a magnetic disk or optical disc and corresponding drive can be coupled to electronic system 500.

Electronic system 500 can also be coupled via bus 501 to display device 521, such as a cathode ray tube (CRT) or liquid crystal display (LCD), to display information to a user. Alphanumeric input device 522, including alphanumeric and other keys, is typically coupled to bus 501 to communicate information and command selections to processor 502. Another type of user input device is cursor control 523, such as a mouse, a trackball, or cursor direction keys to communicate direction information and command selections to processor 502 and to control cursor movement on display 521. Electronic system 500 further includes network interface 530 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 530) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications changes can be made thereto without departing from the broader spirit and scope of the invention. The specification and drawings are, accordingly, to be regarded in an illustrative rather than a restrictive sense.

What is claimed is:

1. A computer-implemented method comprising:
searching a plurality of paths and sub-paths arranged in a file system hierarchy on a source electronic device according to a path analysis option to locate files containing data and applications corresponding to a user, wherein the searching comprises analyzing the sub-paths to a maximum depth in the file system hierarchy, the source electronic device having at least user-specific system configuration data corresponding to the user and operation of the source electronic device, and wherein the path analysis option indicates a path to be included in the search or a path to be excluded from the search;

including the user-specific system configuration data
found through the searching in a copy list; and
transferring data corresponding to the copy list from the
source electronic device to a destination electronic
device.

2. The computer-implemented method of claim 1 further comprising:
allowing a user to select additional data to be transferred from the source electronic device to the destination electronic device.

3. The computer-implemented method of claim 2, wherein the additional data comprises one or more of: disk partitions of the source electronic system, applications, and data files.

4. The computer-implemented method of claim 1 further comprising:
determining if data on the destination electronic device conflicts with data corresponding to the copy list; and
modifying the conflicting data if data on the destination electronic device conflicts with data corresponding to the copy list.

5. The computer-implemented method of claim 1 further comprising:
providing a listing to a user of data that may be transferred from the source electronic device to the destination electronic device;
receiving user input indicating selected additional data to be transferred from the source electronic device to the destination electronic device; and
transferring the selected additional data from the source electronic device to the destination electronic device.

6. The computer-implemented method of claim 1, wherein the configuration data comprises one or more of: a user name, a password, network settings and local system settings.

7. The computer-implemented method of claim 1, wherein the destination electronic device controls access to data stored on the source electronic device without accessing the data through a normal operating mode for the source electronic device.

8. An article comprising a non-transitory machine-readable medium having stored thereon instructions to cause one or more processors to:
search a plurality of paths and sub-paths arranged in a file system hierarchy on a source electronic device according to a path analysis option to locate files containing data and applications corresponding to a user, wherein the searching comprises analyzing the sub-paths to a maximum depth in the file system hierarchy, the source electronic device having at least user-specific system configuration data corresponding to the user and operation of the source electronic device, and wherein the path analysis option indicates a path to be included in the search or a path to be excluded from the search;
include the user-specific system configuration data found through the searching in a copy list; and
transfer data corresponding to the copy list from the source electronic device to a destination electronic device.

9. The article of claim 8 further comprising instructions to cause the one or more processors to allow a user to select additional data to be transferred from the source electronic device to the destination electronic device.

10. The article of claim 8 further comprising instructions that to cause the one or more processors to:
determine if data on the destination electronic device conflicts with data corresponding to the copy list; and
modify the conflicting data if data on the destination electronic device conflicts with data corresponding to the copy list.

11. The article of claim 8 further comprising instructions to cause the one or more processors to:
provide a listing to a user of data that may be transferred from the source electronic device to the destination electronic device;
receive user input indicating selected additional data to be transferred from the source electronic device to the destination electronic device; and
transfer the selected additional data from the source electronic device to the destination electronic device.

12. The article of claim 8, wherein the destination electronic device controls access to data stored on the source electronic device without accessing the data through a normal operating mode for the source electronic device.

13. A system comprising:
a communications interface; and
a memory device coupled with the communications interface having stored thereon instructions to cause one or more processors within the system coupled with the memory device to:
search a plurality of paths and sub-paths arranged in a file system hierarchy on a source electronic device according to a path analysis option to locate files containing data and applications corresponding to a user, wherein the searching comprises analyzing the sub-paths to a maximum depth in the file system hierarchy, the source electronic device having at least user-specific system configuration data corresponding to the user and operation of the source electronic device, and wherein the path analysis option indicates a path to be included in the search or a path to be excluded from the search,
include the user-specific system configuration data found through the searching in a copy list, and
transfer data corresponding to the copy list from the source electronic device to a destination electronic device.

14. The system of claim 13 wherein the memory device further stores instructions to cause the one or more processors to allow a user to select additional data to be transferred from the source electronic device to the destination electronic device.

15. The system of claim 13 wherein the memory device further stores instructions to cause the one or more processors to:
determine if data on the destination electronic device conflicts with data corresponding to the copy list; and
modify the conflicting data if data on the destination electronics device conflicts with data corresponding to the copy list.

16. The system of claim 13 wherein the memory device further stores instructions to cause the one or more processors to:
provide a listing to a user of data that may be transferred from the source electronic device to the destination electronic device;
receive user input indicating selected additional data to be transferred from the source electronic device to the destination electronic device; and
transfer the selected additional data from the source electronic device to the destination electronic device.

17. The system of claim 13, wherein the destination electronic device controls access to data stored on the source electronic device without accessing the data through a normal operating mode for the source electronic device.

18. An apparatus comprising:
means for searching a plurality of paths and sub-paths arranged in a file system hierarchy on a source electronic device according to a path analysis option to locate files containing data and applications corresponding to a user, wherein the searching comprises analyzing the sub-paths to a maximum depth in the file system hierarchy, the source electronic device having at least user-specific system configuration data corresponding to the user and operation of the source electronic device, and wherein the path analysis option indicates a path to be included in the search or a path to be excluded from the search;
means for including the user-specific system configuration data found through the searching in a copy list; and
means for transferring data corresponding to the copy list from the source electronic device to a destination electronic device.

19. The apparatus of claim 18 further comprising:
means for allowing a user to select additional data to be transferred from the source electronic device to the destination electronic device.

20. The means of claim 18 further comprising:
means for determining if data on the destination electronic device conflicts with data corresponding to the copy list; and
means for modifying the conflicting data if data on the destination electronic device conflicts with data corresponding to the copy list.

21. The apparatus of claim 18 further comprising:
means for providing a listing to a user of data that may be transferred from the source electronic device to the destination electronic device;
means for receiving user input indicating selected additional data to be transferred from the source electronic device to the destination electronic device; and
means for transferring the selected additional data from the source electronic device to the destination electronic device.

22. The apparatus of claim 18, wherein the destination electronic device controls access to data stored on the source electronic device without accessing the data through a normal operating mode for the source electronic device.

* * * * *